United States Patent [19]
Vukovich et al.

[11] Patent Number: 5,434,779
[45] Date of Patent: Jul. 18, 1995

[54] ADAPTIVE PRESSURE CONTROL FOR AN AUTOMATIC TRANSMISSION

[75] Inventors: William J. Vukovich, Ypsilanti; Melissa M. Koenig, Ann Arbor, both of Mich.

[73] Assignee: General Motors Corporation, Detroit, Mich.

[21] Appl. No.: 775,395

[22] Filed: Oct. 15, 1991

[51] Int. Cl.⁶ ............................................. F16D 31/00
[52] U.S. Cl. ........................ 364/424.1; 364/424.01; 477/150; 477/161; 477/154; 477/163; 477/143; 477/129; 123/674; 123/686; 192/3.28
[58] Field of Search .............. 364/424.1, 424.01; 74/866; 123/489, 674, 686; 477/150, 155, 129, 143, 906, 163, 158, 154, 63, 65, 160, 161; 192/3.28

[56] References Cited

U.S. PATENT DOCUMENTS

| | | | |
|---|---|---|---|
| 4,283,970 | 8/1981 | Vukovich | 74/866 |
| 4,488,456 | 12/1984 | Taga et al. | 74/866 |
| 4,495,576 | 1/1985 | Ito | 364/424.1 |
| 4,653,350 | 3/1987 | Downs et al. | 74/864 |
| 4,742,461 | 5/1988 | Eschrich et al. | 364/424.1 |
| 4,844,041 | 7/1989 | Ave et al. | 123/489 |
| 4,981,053 | 1/1991 | Yamaguchi | 74/866 |
| 5,052,246 | 10/1991 | Yamaguchi | 74/866 |
| 5,151,858 | 9/1992 | Milunas et al. | 364/424.1 |
| 5,157,608 | 10/1992 | Sankpal et al. | 364/424.1 |
| 5,163,342 | 11/1992 | Pollack et al. | 74/866 |

Primary Examiner—Kevin J. Teska
Assistant Examiner—Jacques H. Louis-Jacques
Attorney, Agent, or Firm—Vincent A. Cichosz

[57] ABSTRACT

An improved adaptive transmission pressure control in which cumulative adaptive corrections are stored in a multi-cell memory array, the cells being associated with specified contiguous ranges of a vehicle operating parameter, such as engine throttle position. Periodically determined adaptive correction amounts are applied to a selected cell which includes the engine throttle setting measured at the initiation of the shift and to two or more cells associated with contiguous engine throttle ranges. In this way, a relatively large number of cells may be employed to minimize approximation errors, while maintaining a cell-to-cell continuum of pressure correction values. In operation, an electro-hydraulic pressure regulator is controlled as a combined function of a predefined pressure command obtained from a normal table look-up and a cumulative correction amount obtained from the memory array.

8 Claims, 8 Drawing Sheets

| GEAR | RATIO | C1 | C2 | C3 | C4 | C5 | OC | CR |
|---|---|---|---|---|---|---|---|---|
| 1st | 3.61 | ON | OFF | OFF | ON | OFF | ON | OFF |
| 2nd | 1.85 | ON | ON | OFF | ON | OFF | ON | OFF |
| 3rd | 1.37 | ON | ON | OFF | ON | ON | OFF | OFF |
| 4th | 1.00 | ON | ON | ON | OFF | OFF | ON | OFF |
| 5th | 0.74 | ON | ON | ON | OFF | ON | OFF | OFF |
| P/N | — | OFF | OFF | OFF | OFF | OFF | ON | OFF |
| R | -2.06 | OFF | OFF | ON | OFF | OFF | ON | ON |

FIG. 2

| SOLENOID STATES | | | |
|---|---|---|---|
| GEAR | SOLENOID A | SOLENOID B | SOLENOID C |
| 1st | ON | OFF | ON |
| 2nd | OFF | OFF | ON |
| 3rd | OFF | ON | ON |
| 4th | OFF | OFF | OFF |
| 5th | OFF | ON | OFF |

ADAPTIVE PRESSURE CONTROL FOR AN AUTOMATIC TRANSMISSION

This invention relates to adaptive pressure control in a motor vehicle automatic transmission, and more particularly, to a control method and apparatus for storing and applying adaptive corrections.

BACKGROUND OF THE INVENTION

Automatic transmissions of the type addressed by this invention include several fluid operated torque transmitting devices, referred to herein as clutches, which are automatically engaged and disengaged according to a predefined pattern to establish different speed ratios between input and output shafts of the transmission. The input shaft is coupled to an internal combustion engine through a fluid coupling, such as a torque converter, and the output shaft is mechanically connected to drive one or more vehicle wheels.

The various speed ratios of the transmission are typically defined in terms of the ratio Ni/No, where Ni is the input shaft speed and No is the output shaft speed. Speed ratios having a relatively high numerical value provide a relatively low output speed and are generally referred to as lower speed ratios; speed ratios having a relatively low numerical value provide a relatively high output speed and are generally referred to as upper speed ratios. Accordingly, shifts from a given speed ratio to a lower speed ratio are referred to as downshifts, while shifts from a given speed ratio to a higher speed ratio are referred to as upshifts.

In most transmissions, ratio shifting is carried out by directing the fluid pressure output of a driven pump, referred to as line pressure, to the various clutches of the transmission in accordance with a predefined pattern. To this end, the transmission includes hydraulic or electro-hydraulic elements, such as shift valves and accumulators activated in response to vehicle operating parameters.

Certain transmissions also include electrical elements for controlling the line pressure regulation in accordance with a scheduled pressure obtained from a table look-up. The scheduled pressure is generally speed and load (torque) dependent, and operates not only to maintain adequate torque capacity in engaged clutches, but also to control clutch engagement rate during shifting. In such transmissions, an adaptive trim or correction of the scheduled pressure can be employed as a means of compensating for variability associated with part-to-part tolerances, wear, etc. One such control, set forth in U.S. Pat. No. 4,283,970 to Vukovich, issued Aug. 18, 1981, and assigned to the assignee of the present invention, develops an adaptive correction of the scheduled line pressure based on a deviation of the actual shift time from a desired shift time characteristic of high quality shift feel. Also see U.S. Pat. No. 4,653,350 to Downs et al., issued Mar. 31, 1987, and assigned to the assignee of the present invention.

According to the Vukovich patent, the adaptive correction is stored in a correction register, which maintains a single cumulative correction for the normally scheduled line pressure. In practice, a number of correction registers for various ranges of engine throttle setting (or input torque) have been employed. According to the Downs patent, the adaptive correction updates are apportioned between low and high torque data points of a correction table, and the adaptive correction for intermediate torque levels is obtained by interpolation.

SUMMARY OF THE PRESENT INVENTION

The present invention is directed to an improved adaptive pressure control in which the cumulative adaptive corrections are stored in a multi-cell memory array, where the cells are associated with specified contiguous ranges of a vehicle operating parameter, such as engine throttle position. Periodically determined adaptive correction amounts are applied to a selected cell which includes the engine throttle setting measured at the initiation of the shift and to two or more cells associated with contiguous engine throttle ranges. In this way, a relatively large number of cells may be employed to minimize approximation errors, while maintaining a cell-to-cell continuum of pressure correction values.

In the illustrated embodiment, the full adaptive correction amount is applied to the selected cell, and decreasing percentages of the correction amount are applied to the cells associated with the contiguous throttle position ranges. In operation, then, the electro-hydraulic pressure regulator is controlled as a combined function of a predefined pressure command obtained from the normal table look-up and a cumulative correction amount obtained from the memory array.

BRIEF DESCRIPTION OF THE DRAWINGS

FIGS. 4 and 5 graphically illustrate a multiple cell memory array according to this invention.

DETAILED DESCRIPTION OF THE INVENTION

Figure 1A:
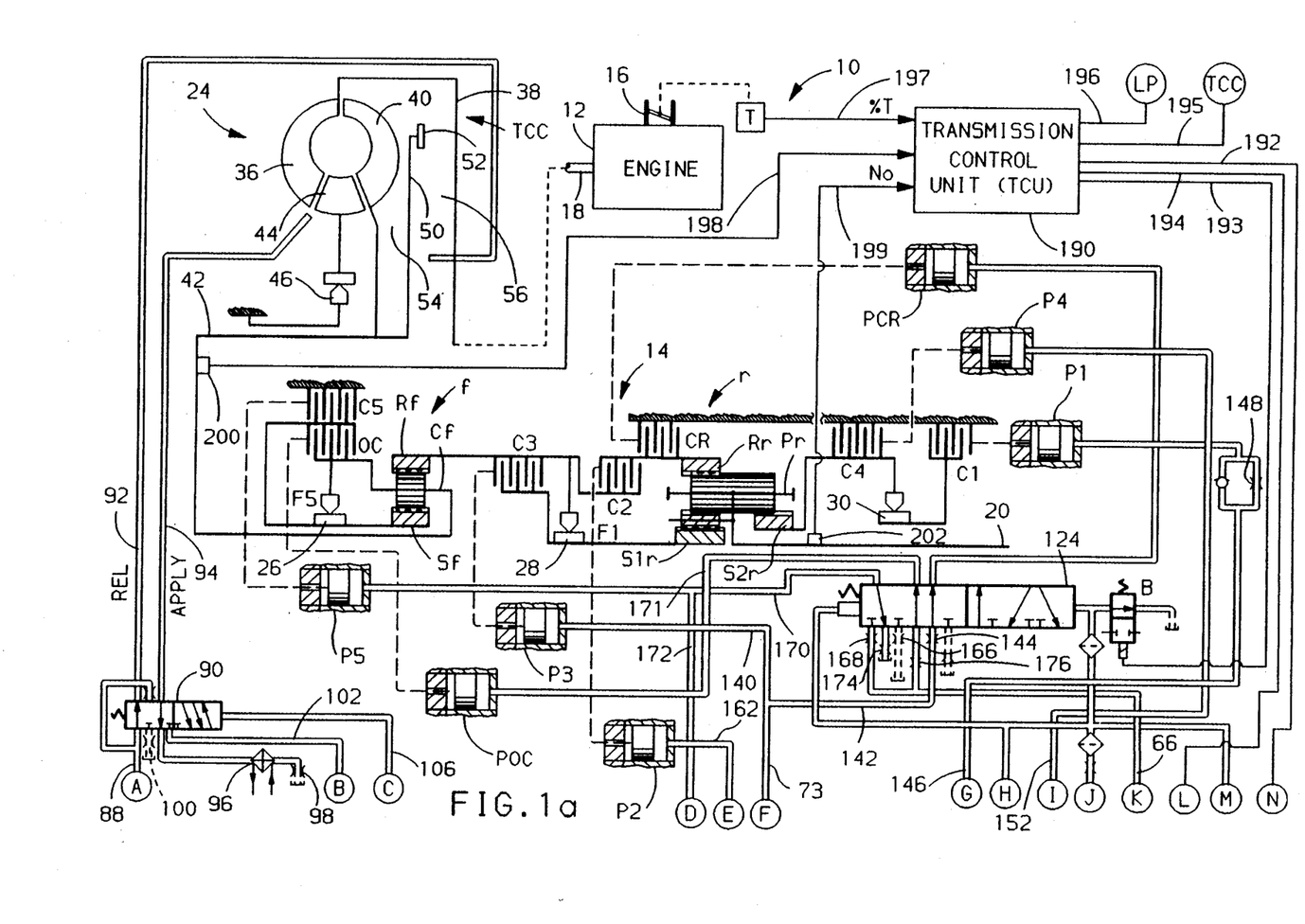
FIGS. 1a–1b form a schematic diagram of a five-speed automatic transmission controlled in accordance with this invention by a computer-based control unit.
Figure 1B:
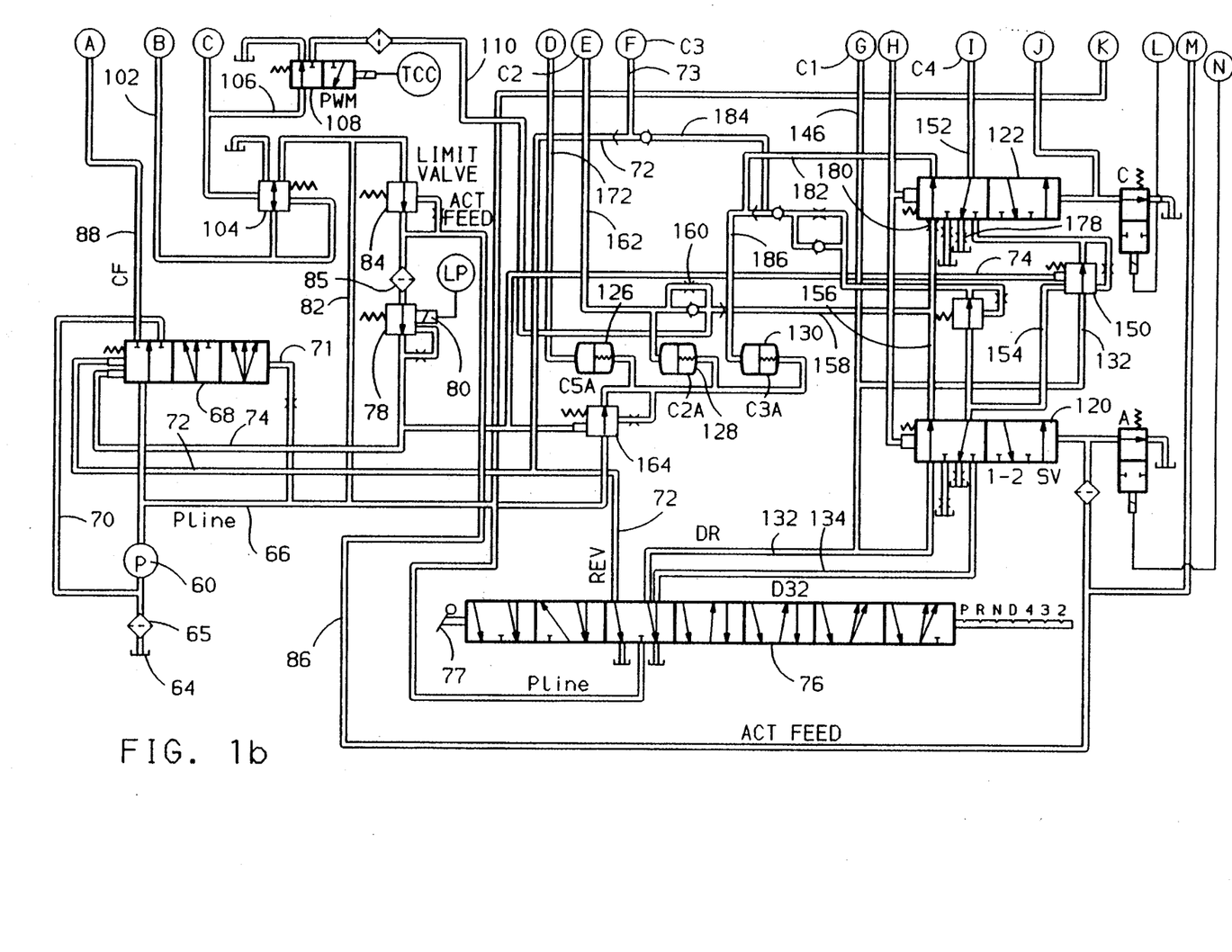

Referring now to FIGS. 1a–1b of the drawings, the reference numeral 10 generally designates a motor vehicle drivetrain including an engine 12 and a planetary transmission 14 having a reverse speed ratio and five forward speed ratios. Engine 12 includes a throttle mechanism 16 mechanically connected to an operator manipulated device, such as an accelerator pedal (not shown), for regulating the air intake of the engine. The engine 12 is fueled by a conventional method in relation to the air intake to produce output torque in proportion thereto. Such torque is applied to the transmission 14 through the engine output shaft 18. The transmission 14, in turn, transmits engine output torque to an output shaft 20 through a torque converter 24 and one or more of the fluid operated clutches C1–C5, OC, Reverse clutch CR, and one-way clutches 26–30, such clutches being applied or released according to a predetermined schedule for establishing a desired transmission speed ratio.

Referring now more particularly to the transmission 14, the impeller or input member 36 of the torque converter 24 is connected to be rotatably driven by the output shaft 18 of engine 12 through the input shell 38. The turbine or output member 40 of the torque converter 24 is rotatably driven by the impeller 36 by means of fluid transfer therebetween and is connected to rotatably drive the turbine shaft 42. A stator member 44 redirects the fluid which couples the impeller 36 to the turbine 40, the stator being connected through a one-way device 46 to the housing of transmission 14.

The torque converter 24 also includes a clutch TCC comprising a clutch plate 50 secured to the turbine shaft 42. The clutch plate 50 has a friction surface 52 formed thereon adaptable to be engaged with the inner surface of the input shell 38 to form a direct mechanical drive between the engine output shaft 18 and the turbine shaft 42. The clutch plate 50 divides the space between input shell 38 and the turbine 40 into two fluid chambers: an apply chamber 54 and a release chamber 56.

When the fluid pressure in the apply chamber 54 exceeds that in the release chamber 56, the friction surface 52 of clutch plate 50 is moved into engagement with the input shell 38, thereby engaging the TCC to provide a mechanical drive connection in parallel with the torque converter 24. In such case, there is no slippage between the impeller 36 and the turbine 40. When the fluid pressure in the release chamber 56 exceeds that in the apply chamber 54, the friction surface 52 of the clutch plate 50 is moved out of engagement with the input shell 38, as shown in FIG. 1a, thereby uncoupling such mechanical drive connection and permitting slippage between the impeller 36 and the turbine 40.

The turbine shaft 42 is connected as an input to the carrier Cf of a forward planetary gearset f. The sun Sf is connected to carrier Cf via the parallel combination of one-way clutch F5 and friction clutch OC. The clutch C5 is selectively engageable to ground the sun Sf. The ring Rf is connected as an input to the sun S1r of a compound rearward planetary gearset r via the parallel combination of one-way clutch F1 and friction clutch C3. The clutch C2 selectively connects the forward gearset ring Rf to rearward gearset ring Rr, and the Reverse clutch CR selectively grounds the ring Rr. The sun S2r is selectively grounded by clutch C4 or by clutch C1 through the one-way clutch F2. The pinion Pr mechanically couples the pinion gears and is connected as an output to shaft 20.

Figure 2:
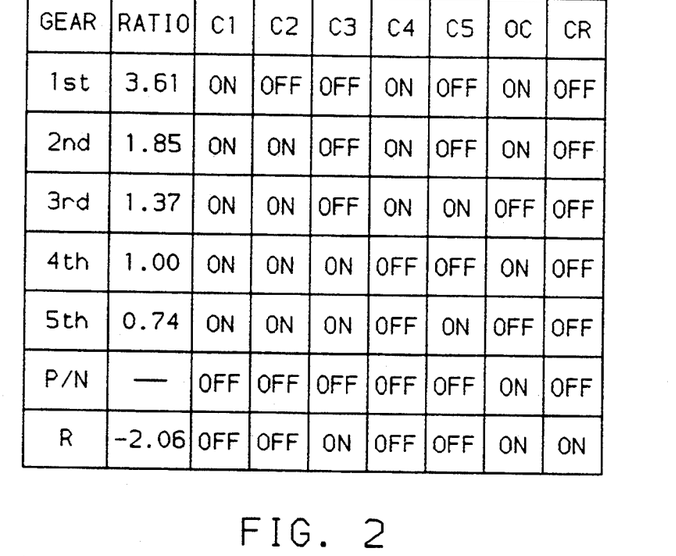
FIG. 2 is a state diagram for the clutches of the transmission depicted in FIGS. 1a–1b.

The various speed ratios and the clutch states required to establish them are set forth in the chart of FIG. 2. Referring to that Figure, it is seen that the Park/Neutral condition is established by releasing all of the clutches with the exception of clutch OC. A garage shift to Reverse is effected by engaging the C3 and CR clutches. In the forward speed ranges, a garage shift to 1st is effected by engaging the clutches C1 and C4. In this case, the forward gearset f is locked up and the one-way clutch F1 applies the turbine speed Nt as an input to the sun element Sr of rearward gearset r, providing a Ni/No ratio of 3.61.

As the vehicle speed increases, an upshift from 1st to 2nd is effected simply by engaging clutch C2; the one-way clutch F1 overruns as soon as on-coming clutch C2 develops sufficient torque capacity. The forward gearset f remains locked up, and the clutch C2 applies the turbine speed Nt as an input to the ring element Rr of rearward gearset r to provide a Ni/No ratio of 1.85. Downshifting from 2nd to 1st merely involves releasing clutch C2.

The upshift from 2nd to 3rd is effected by engaging clutch C5 and releasing clutch OC so that the forward gearset operates as an overdrive, thereby providing a Ni/No ratio of 1.37. Downshifting from 3rd to 2nd is effected by releasing clutch C5 and engaging clutch OC to return the forward gearset f to a lock-up condition.

The upshift from 3rd and 4th is effected by releasing clutch C5 and engaging clutch OC to return the forward gearset f to a lock-up condition, while releasing clutch C4 and engaging clutch C3 to lock-up the rearward gearset r, one-way clutch F2 releasing the rear planet axis Pr. In this case, the turbine speed Nt is transmitted directly to output shaft 20 for a Ni/No ratio of 1.00. The downshift 4th to 3rd is effected by releasing clutch OC and engaging clutch C5 to return the forward gearset f to an overdrive condition, while releasing clutch C3 and engaging clutch C4 to apply turbine speed Nt as an input to the ring element Rr.

Completing the shift analysis, the upshift from 4th to 5th is effected by engaging clutch C5 (and releasing clutch OC if engine braking is selected) to operate the forward gearset f in an overdrive condition, thereby providing a Ni/No ratio of 0.74. Downshifting from 5th to 4th is effected by releasing clutch C5 (and engaging clutch OC if engine braking is selected).

A positive displacement hydraulic pump 60 is mechanically driven by the engine output shaft 18. Pump 60 receives hydraulic fluid at low pressure from the fluid reservoir 64 and filter 65, and supplies line pressure fluid to the transmission control elements via output line 66. A pressure regulator valve (PRY) 68 is connected to the pump output line 66 and serves to regulate the line pressure by returning a controlled portion of the line pressure to reservoir 64 via the line 70. The PRY 68 is biased at one end by orificed line pressure in line 71 and at the other end by the combination of a spring force, a Reverse ratio fluid pressure in line 72 and a controlled bias pressure in line 74.

The Reverse fluid pressure is supplied by a Manual Valve 76, described below. The controlled bias pressure is supplied by a Line Pressure Bias Valve 78 which develops pressure in relation to the current supplied to electric force motor 80. Line pressure is supplied as an input to valve 78 via line 82, a pressure limiting valve 84 and filter 85. The limited line pressure, referred to as ACT FEED pressure, is also supplied as an input to other electrically operated actuators of the control system via line 86. With the above-described valving arrangement, it will be seen that the line pressure of the transmission is electrically regulated by force motor 80.

In addition to regulating line pressure, the PRY 68 develops a regulated converter feed (CF) pressure for the torque converter 24 in line 88. The CF pressure is supplied as an input to TCC Control Valve 90, which, in turn, directs the CF pressure to the release chamber 56 of torque converter 24 via line 92 when open converter operation is desired. In this case, the return fluid from torque converter 24 is exhausted via line 94, the TCC Control Valve 90, an oil cooler 96 and an orifice 98.

When closed converter operation is desired, the TCC Control Valve 90 exhausts the release chamber 56 of torque converter 24 to an orificed exhaust 100, and supplies a regulated TCC apply pressure in line 102 to the apply chamber 54, thereby engaging the TCC. The TCC apply pressure in line 102 is developed from line pressure by a TCC Regulator Valve 104.

Both the TCC Control Valve 90 and the TCC Regulator Valve 104 are spring biased to effect the open converter condition, and in each case, the spring force is opposed by an electrically developed control pressure in line 106. The control pressure in line 106 is developed by the solenoid operated TCC Bias Valve 108, through a ratiometric regulation of the fluid pressure in line 110.

When closed converter operation is desired, the solenoid of TCC Bias Valve 108 is pulse-width-modulated at a controlled duty cycle to ramp up the bias pressure in line 106. Bias pressures above the pressure required to shift the TCC Control Valve to the closed-converter state are used to control the TCC apply pressure developed in line 102 by TCC Regulator Valve 104. In this way, the TCC Bias Valve 108 is used to control the torque capacity of the TCC when closed converter operation is desired.

The friction clutches C1–C5, OC and CR are activated by conventional fluid operated pistons P1-P5, POC and PCR, respectively. The pistons, in turn, are connected to a fluid supply system comprising the Manual Valve 76 referred to above, the Shift Valves 120, 122 and 124, and the Accumulators 126, 128 and 130. The Manual Valve 76 develops supply pressures for Reverse (REV) and the various forward ranges (DR, D32) in response to driver positioning of the transmission range selector 77. The REV, DR and D32 pressures, in turn, are supplied via lines 72, 132 and 134 to the various Shift Valves 120–124 for application to the fluid operated pistons P1–P5, POC and PCR. The Shift Valves 120, 122 and 124 are each spring biased against controlled bias pressures, the controlled bias pressures being developed by the solenoid operated valves A, C and B. The accumulators 126, 128 and 130 are used to cushion the apply, and in some cases the release, of clutches C5, C2 and C3, respectively.

Figure 3:
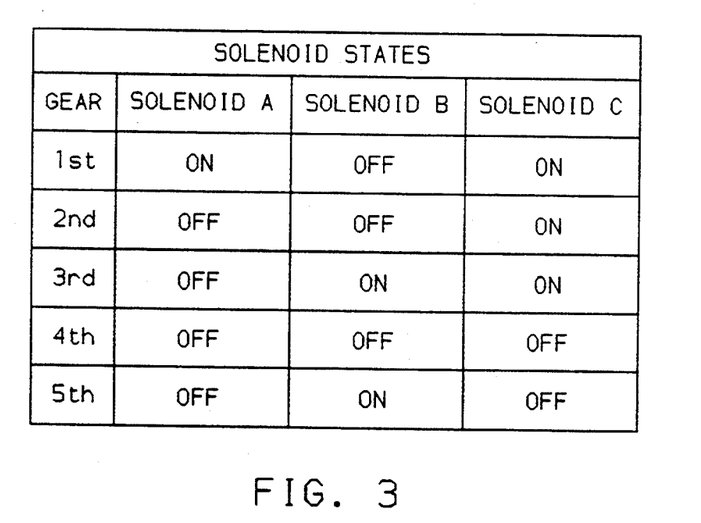
FIG. 3 is a chart depicting the electrical state changes required for shifting from one speed ratio to another.

A chart of the ON/OFF states of valves A, C and B for establishing the various transmission speed ratios is given in FIG. 3. In Neutral and Park, the solenoids A, B and C are all off. In this condition, line pressure is supplied to clutch piston POC through orifice 176, but the remaining clutches are all disengaged. Reverse fluid pressure, when generated by Manual Valve 76 in response to driver displacement of range selector 77, is supplied directly to clutch piston P3 via lines 72, 73 and 140, and to clutch piston PCR via lines 72, 142, orifice 144 and Shift Valve 124.

A garage shift to the forward (Drive) ranges is effected when Manual Valve 76 is moved to the D position, connecting line pressure to the DR pressure supply line 132. The DR pressure is supplied to the clutch piston P1 via line 146 and orifice 148 to progressively engage clutch C1. At the same time, Solenoid Operated Valves A and C are energized to actuate Shift Valves 120 and 122. The Shift Valve 122 directs DR pressure in line 132 to clutch piston P4 via Regulator Valve 150 and line 152. The Shift Valve 120 supplies a bias pressure to the Regulator Valve 150 via line 154 to boost the C4 pressure. In this way, clutches C1, C4 and OC are engaged to establish 1st speed ratio.

Referring to the chart of FIG. 3, a 1–2 upshift is effected by deenergizing Solenoid Operated Valve A to return Shift Valve 120 to its default state. This routes DR pressure in line 132 to the clutch piston P2 via Shift Valve 120, lines 156, 158 and 162, and orifice 160 to engage the clutch C2. Line 162 is also connected as an input to accumulator 128, the backside of which is maintained at a regulated pressure developed by valve 164. The engagement of clutch C2 is thereby cushioned as the C2 apply pressure, resisted by spring force, strokes the piston of accumulator 128. Of course, a 2–1 downshift is effected by energizing the Solenoid Operated Valve A.

Referring again to the chart of FIG. 3, a 2–3 upshift is effected by energizing Solenoid Operated Valve B to actuate the Shift Valve 124. This exhausts the clutch piston POC via orifice 166 to release the clutch OC, and supplies line pressure in line 66 to clutch piston P5 via orifice 168 and line 170 to progressively engage clutch C5. Line 170 is connected via line 172 as an input to accumulator 126, the backside of which is maintained at a regulated pressure developed by valve 164. The engagement of clutch C5 is thereby cushioned as the C5 apply pressure, resisted by spring force, strokes the piston of accumulator 126. Of course, a 3–2 downshift is effected by deenergizing the Solenoid Operated Valve B.

Referring again to the chart of FIG. 3, a 3–4 upshift is effected by deenergizing Solenoid Operated Valves B and C to return Shift Valves 124 and 122 to their default positions, as depicted in FIGS. 1a–1b. The Shift Valve 124 thereby (1) exhausts clutch piston P5 and accumulator 126 via line 170 and orifice 174 to release clutch C5, and (2) supplies pressure to clutch piston POC via lines 66 and 171 and orifice 176 to engage clutch OC. The Shift Valve 122 (1) exhausts clutch piston P4 via line 152 and orifice 178 to release clutch C4, and (2) supplies DR pressure in line 132 to clutch piston P3 via Shift Valve 120, orifice 180 and lines 182, 184, 73 and 140 to engage clutch C3.

Line 182 is connected via line 186 as an input to accumulator 130, the backside of which is maintained at a regulated pressure developed by valve 164. The engagement of clutch C3 is thereby cushioned as the C3 apply pressure, resisted by spring force, strokes the piston of accumulator 130. Of course, a 4–3 downshift is effected by energizing the Solenoid Operated Valves B and C.

Referring again to the chart of FIG. 3, a 4–5 upshift is effected by energizing Solenoid Operated Valve B to actuate the Shift Valve 124. This exhausts the clutch piston POC via orifice 166 to release the clutch OC, and supplies line pressure in line 66 to clutch piston P5 via orifice 168 and line 170 to progressively engage clutch P5. As indicated below, line 170 is also connected via line 172 as an input to accumulator 126, which cushions the engagement of clutch C5 as the C5 apply pressure, resisted by spring force, strokes the piston of accumulator 126. Of course, a 5–4 downshift is effected by deenergizing the Solenoid Operated Valve B.

The Solenoid Operated Valves A, B and C, the TCC Bias Valve 108 and the Line Pressure Bias Valve 78 are all controlled by a computer-based Transmission Control Unit (TCU) 190 via lines 192–196. As indicated above, the valves A, B and C require simple on/off controls, while the valves 108 and 78 are pulse-width-modulated (PWM). The control is carried out in response to a number of input signals, including an engine throttle signal %T on line 197, a turbine speed signal Nt on line 198 and an output speed signal No on line 199. The throttle signal is based on the position of engine throttle 16, as sensed by transducer T; the turbine speed signal is based on the speed of turbine shaft 42, as sensed by sensor 200; and the output speed signal is based on the speed of output shaft 20, as sensed by sensor 202. In carrying out the control, the TCU 190 executes a series of computer program instructions, represented by the flow diagrams of FIGS. 7-9 described below.

As indicated above, the present invention concerns the energization of force motor 80 for the development of a suitable transmission line pressure. As noted in the above-referenced Vukovich and Downs et al. patents, the fluid pressure supplied to the hydraulic ratio interchange devices directly affects the shift quality. If the pressure is too high, the shift will progress too quickly, resulting in a harsh shift feel. If the pressure is too low, the shift will progress too slowly, resulting in excessive wear and heat generation. The pressure is typically scheduled by table look-up as a function of engine throttle (or transmission input torque) and vehicle speed to achieve a desired shift progression. Even if the pressure is scheduled properly, however, variations may occur due to part-to-part tolerance variations, wear, age, etc.

Figure 4A:
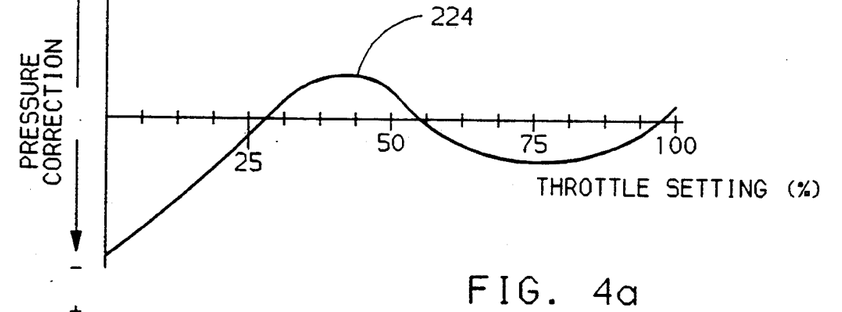
FIG. 4a depicts a required pressure correction.

Such shift quality variations may be avoided, according to the above-referenced patents, by analyzing the progression of shifting performed at the scheduled pressure, and adaptively correcting the scheduled pressure if a deviation from a desired shift progression is observed. For purposes of illustration, the broken trace 224 of FIG. 4a graphically depicts the required pressure correction as a function of engine throttle setting. Without adaptive correction, the pressure error for any throttle setting is thus represented by the magnitude of the pressure correction trace.

Figure 4B:
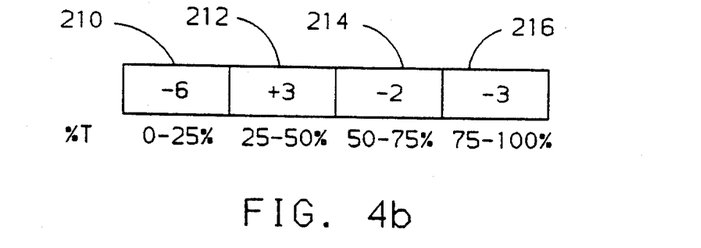
FIG. 4b depicts a four-cell memory array containing pressure correction amounts.

A straightforward approach to correcting the scheduled pressure is to store the pressure corrections in a memory cell array, as graphically depicted in FIG. 4b. The individual cells, represented by the four boxes 210-216, are associated with four contiguous ranges of engine throttle position—namely, 0%-25%, 25%-50%, 50%-75% and 75%-100%. The cells 210-216 contain cumulative pressure corrections for the scheduled pressure, and adaptive pressure corrections determined in the course of a given shift are applied to the cell which encompasses the engine throttle setting in effect during the shift. As noted in FIGS. 4a-4b, the pressure corrections may be positive or negative.

In applying the stored cumulative pressure corrections to the scheduled pressure, two approaches are possible. According to a first approach, the stored correction amounts are applied over the entire respective throttle ranges. This approach is graphically illustrated in FIG. 4c, where the solid trace 218 represents the applied pressure correction, and the remaining error is represented by the shaded area between the two traces.

According to a second approach, the stored correction amounts are deemed to represent the midpoint of each throttle position range, and the pressure correction for any given throttle position is determined by interpolation between correction amounts for cells associated with contiguous throttle ranges. This approach is graphically illustrated in FIG. 4d, where the solid trace 220 represents the applied pressure correction, and the remaining error is represented by the shaded area between the two traces. The nearest midpoint correction amounts are applied at the throttle position limits.

Figure 4C:
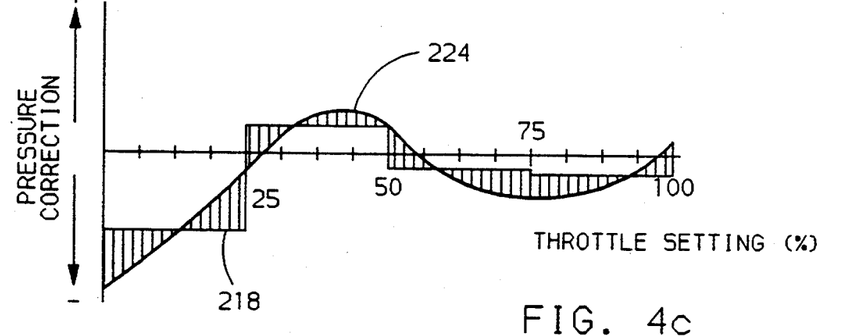
FIG. 4c depicts a noninterpolated application of the correction amounts stored in the four-cell memory array of FIG. 4b.
Figure 4D:
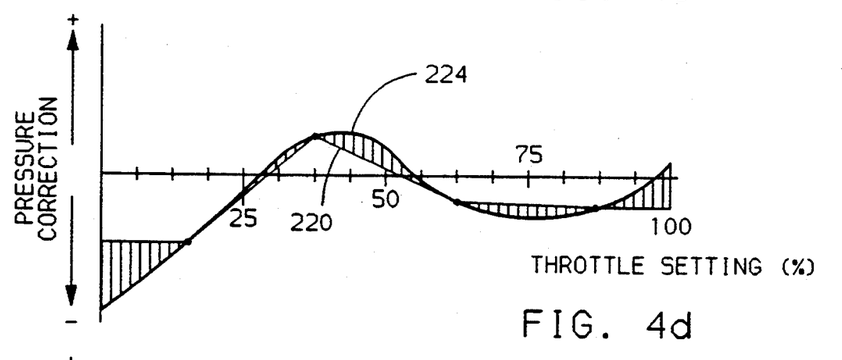
FIG. 4d depicts an interpolated application of the correction amounts stored in the four-cell memory array of FIG. 4b.

The above-described approaches leave a varying degree of uncorrected pressure error, as illustrated in FIGS. 4c and 4d. On first impression, it would appear that the uncorrected error could be further reduced, with either approach, by simply increasing the number of cells. However, this would significantly increase the time required to achieve an overall adaptive convergence since a number of shifts must occur in each throttle range in order to reach equilibrium in the respective cell. Indeed, some cells may remain neutral (zero) after an extended period of operation simply because no adaptive corrections were developed with a throttle setting within the respective throttle setting range.

Figure 4E:
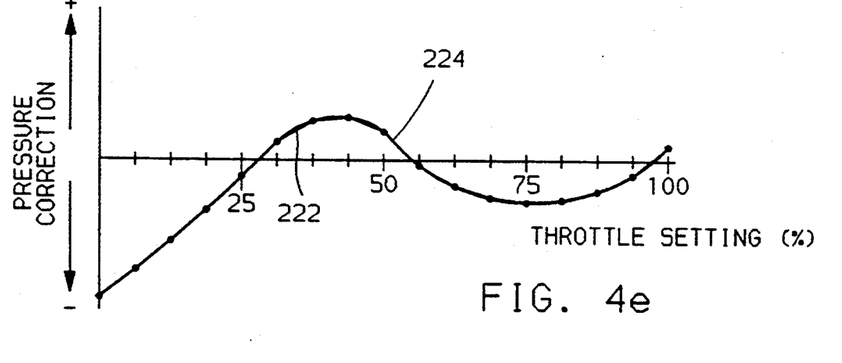
FIG. 4e depicts an interpolated application of the correction amounts stored in a sixteen-cell memory array according to this invention.

The control of this invention overcomes this difficulty, and permits a reduction of uncorrected pressure error by increasing the number of adaptive correction cells through a control involving (1) identifying the primary cell associated with a range of throttle settings including the throttle setting measured at the initiation of a shift in which an adaptive correction amount is developed, and (2) updating the cumulative pressure correction amounts stored in a range of cells including the selected cell in accordance with the adaptive correction amount. The result is graphically depicted in FIG. 4e for a set of sixteen cells, where the solid trace 222 represents the applied pressure correction, and the remaining error is represented by the shaded area between the two traces.

Figure 5:
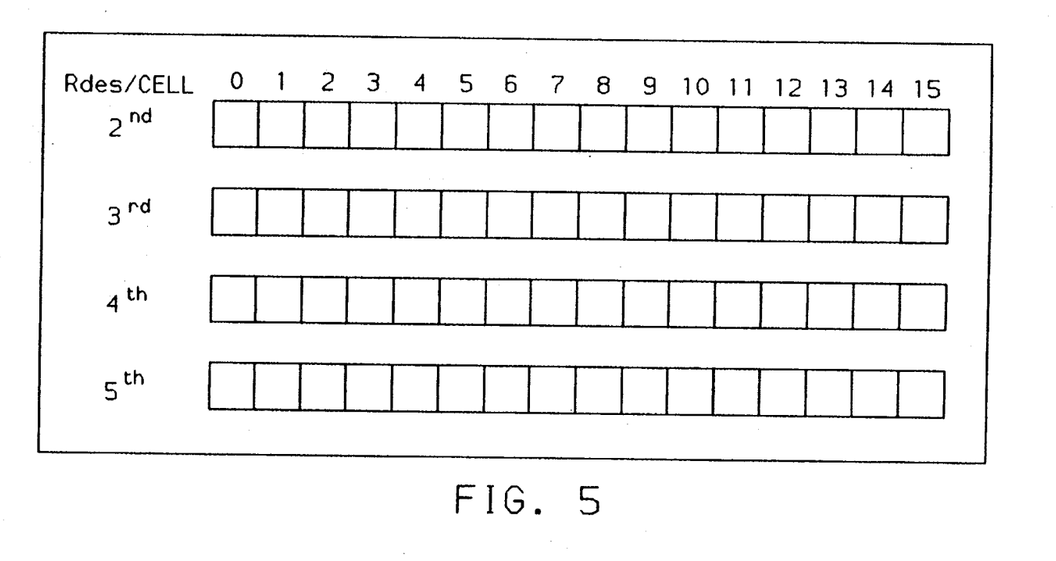

In the illustrated embodiment, adaptive pressure corrections are developed in each of the four types of upshifts (1-2, 2-3, 3-4 and 4-5), and the corrections are stored in four gear-dependent arrays, as schematically designated in FIG. 5 by the numerals 2nd, 3rd, 4th and 5th. Each array comprises a series of sixteen memory cells associated with sixteen contiguous ranges of engine throttle position, for a resolution of 6.25%. With the development of each adaptive correction, an array is selected on the basis of the desired ratio Rdes (or the solenoid state), and a primary cell within that array is selected on the basis of the throttle position %Tinit measured at the initiation of the respective shift.

Figure 6:
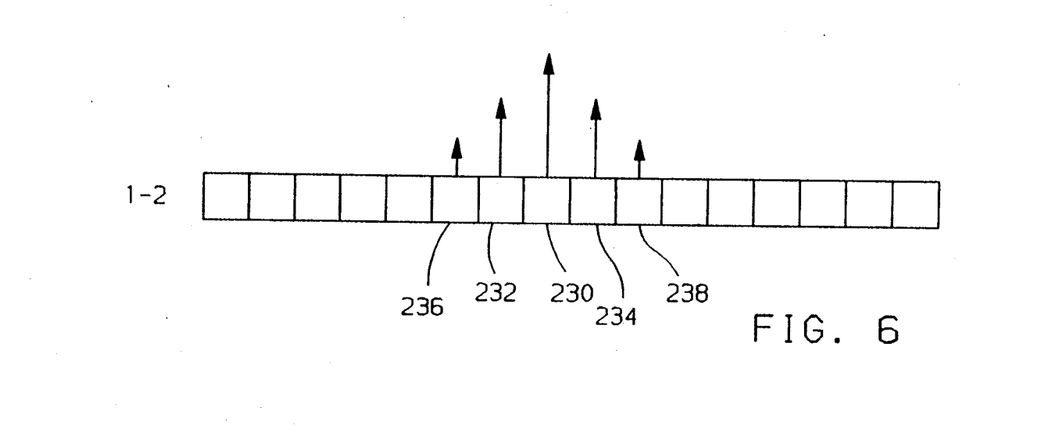
FIG. 6 graphically illustrates a predefined relationship between shift time error and adaptive pressure correction amount.

As graphically illustrated in FIG. 6 with respect to the memory cell array for 2nd gear, the adaptive correction amount is fully applied to the primary cell 230, and partly applied to the four neighboring cells 232-238. In the illustrated embodiment, the 50% of the adaptive correction amount is applied to the cells 232 and 234 immediately adjacent the primary cell 230, and 25% of the adaptive correction amount is applied to the next adjacent cells 236 and 238. Of course, certain lower or upper adjacent cells may not exist, depending on the position of the primary cell within the selected array.

The above described allocation of the adaptive correction amounts is based on the recognition that adaptive correction amounts developed during shifting in a given engine throttle (or input torque) range have relevance, albeit decreased, with respect to neighboring throttle ranges in addition to the primary throttle range. Since each adaptive pressure correction is applied to several cells, the time required to reach adaptive convergence in any given cell is significantly reduced. This fact, coupled with the use of a relatively large number of cells, improves the resolution achieved in applying the cumulative correction amounts to the scheduled pressure values.

Figure 7:
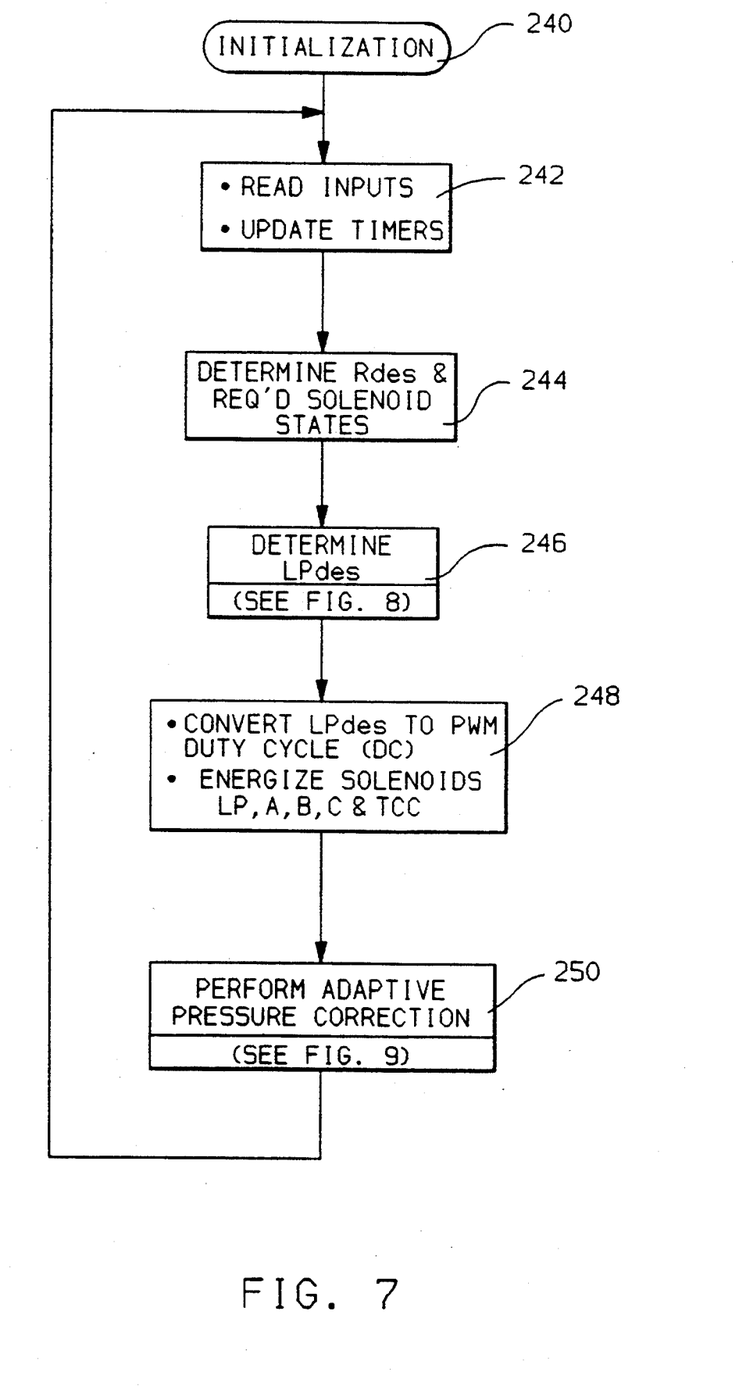
FIGS. 7-9 depict flow diagrams representative of computer program instructions executed by the control unit of FIG. 1a in carrying out the control of this invention.
Figure 8:
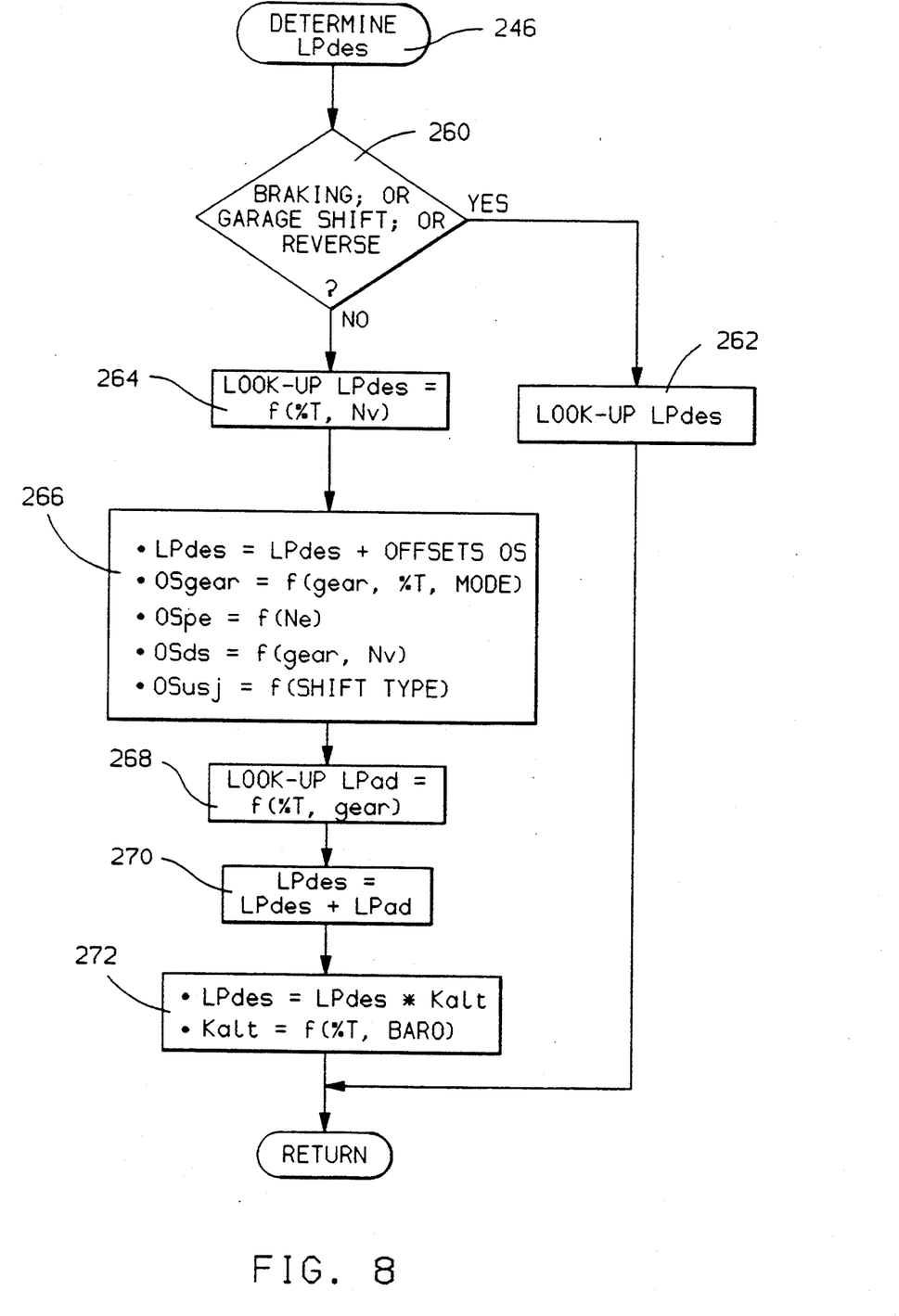
Figure 9:
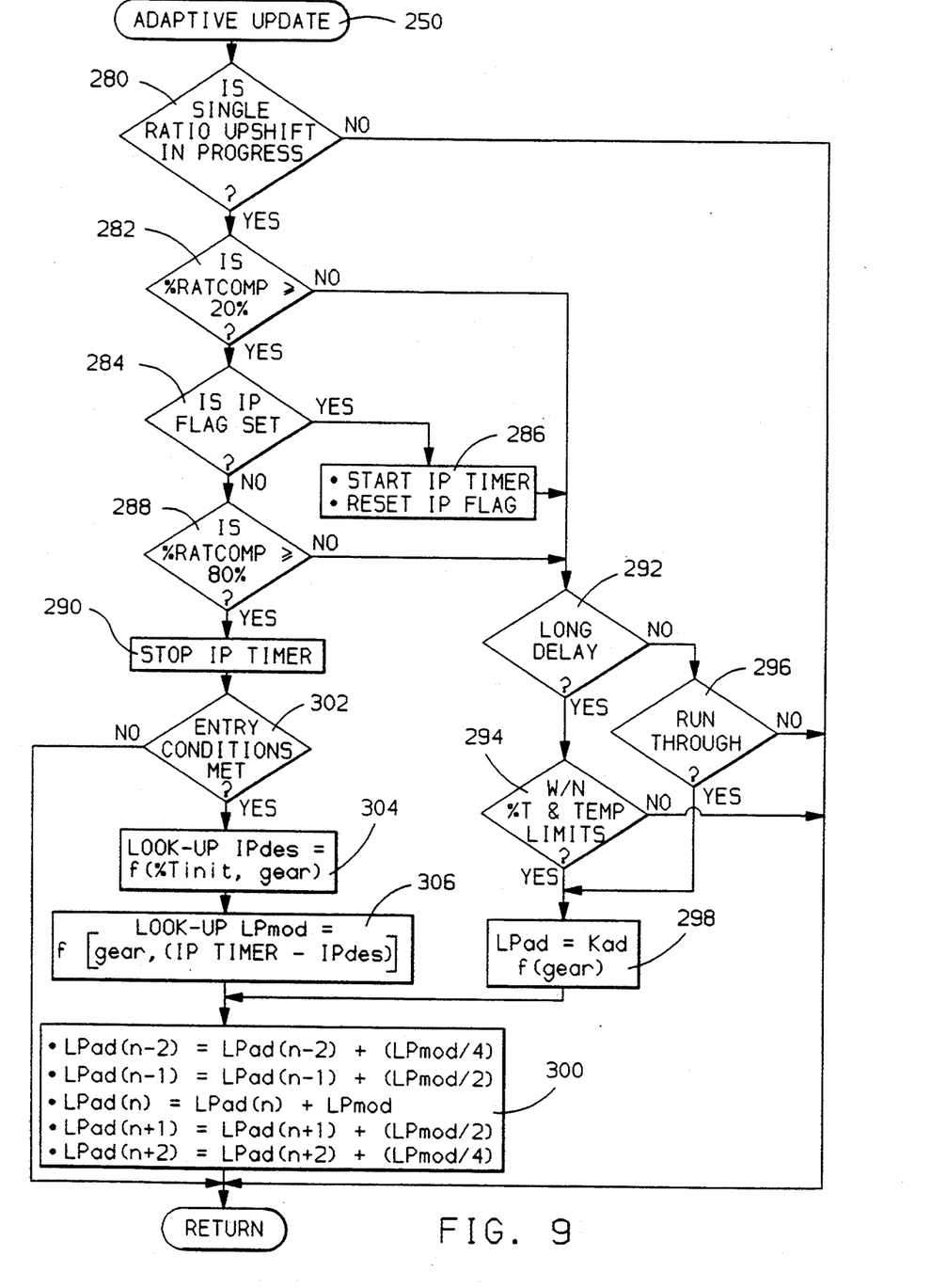

Referring now to FIGS. 7-9, the flow diagram of FIG. 7 represents a main or executive computer program which is periodically executed in the course of vehicle operation in carrying out the control of this invention. The block 240 designates a series of program instructions executed at the initiation of each period of vehicle operation for setting various terms and timer values to an initial condition. Thereafter, the blocks 234-250 are sequentially and repeatedly executed as indicated by the flow diagram line 252.

At block 242, the control unit 190 reads the various inputs referenced in FIG. 1a and updates the loop timers, if any. The block 254 determines the desired speed ratio Rdes and required states of solenoids A, B and C for achieving the desired speed ratio. The desired ratio Rdes may be determined in a conventional manner as a predefined function of engine throttle position %T and output speed No.

The block 246, described in further detail in the flow diagram of FIG. 8, determines the desired line pressure LPdes. The block 248 converts the desired line pressure LPdes to a PWM duty cycle for force motor 80, and suitably energizes the various electro-hydraulic elements, including the force motor 80, the TCC solenoid valve 108, and shift valve solenoids A, B and C. The block 250, described in further detail in the flow diagram of FIG. 9, develops adaptive pressure corrections when appropriate, and updates the adaptive pressure correction cells.

Referring to the line pressure determination flow diagram of FIG. 8, the block 260 is first executed to determine if the transmission is in an engine braking mode, if a garage shift is in progress, or if the Reverse range is engaged. If any of these conditions are true, the block 262 is executed to determine the desired line pressure LPdes using mode-specific look-up tables, not described herein. Otherwise, the blocks 264-272 are executed to look-up the base line pressure LPdes as a function of throttle position %T and vehicle speed Nv, to apply the appropriate offsets, to look-up and apply the cumulative adaptive correction amount LPad, and to compensate for barometric pressure.

The offsets identified in block 266 include a gear-related offset OSgear, an engine power enrichment offset OSpe, a downshift offset OSds, and a jump-shift offset OSusj. The gear-related offset OSgear is determined as a function of gear (solenoid state), throttle position %T, and the state of a driver preference mode (Normal/Performance). The power enrichment offset OSpe is determined as a function of engine speed Ne. The downshift offset OSds is determined as a function of gear and vehicle speed Nv, and jump-shift offset OSusj is determined as a function of the shift type. The barometric pressure, or altitude, compensation of block 272 is carried out with a factor Kalt determined as a function of the throttle position %T and the barometric pressure, as may be determined from an engine manifold absolute pressure sensor (not shown).

As noted with respect to FIG. 5, the adaptive pressure correction LPad is determined as a function of the throttle position %T and gear. Preferably, this look-up involves an interpolation between a pair of adjacent cells of the look-up array, as described above in reference to FIGS. 4d-4e. Alternatively, a look-up of the type described in reference to FIG. 4c could be employed. As indicated at block 270, the adaptive correction LPad is simply added to the base pressure value to form the desired pressure value LPdes.

In the adaptive update flow diagram of FIG. 9, the control unit 190 determines the inertia phase time of each normal upshift through the use of an inertia phase timer IP TIMER, compares the measured time to a reference time IPdes, and updates the adaptive pressure term LPad. If a single ratio upshift is in progress, as determined at block 280, the blocks 282-290 are executed to determine the shift time—that is, the time required to progress from 20% ratio completion to 80% ratio completion. When %RATCOMP, a measure of the percentage of speed ratio completion, first reaches 20%, as determined at block 282, and the IP FLAG is set, the block 286 is executed to start the IP TIMER, and reset the IP FLAG. Thereafter, block 284 will be answered in the negative, and when %RATCOMP reaches 80%, as determined at block 288, the block 290 is executed to stop the IP TIMER.

Prior to the point at which %RATCOMP reaches 80%, the blocks 292-296 are executed to detect the occurrence of a condition in which the shift is progressing too slowly due to abnormally low pressure. In this event, the block 298 is executed to set the adaptive pressure correction term LPad to a predefined, gear-dependent value Kad. The detected condition is referred to as LONG DELAY or RUN THROUGH. The LONG DELAY condition is detected by measuring the time required to effect a turn-down of the turbine speed Nt once a shift has been initiated, and comparing that time to a reference time.

If the measured time exceeds the reference time, a LONG DELAY is indicated, and the block 298 is executed at described above so long as the throttle position %T and transmission oil temperature TEMP are within predefined limits, as determined at block 294. If a LONG DELAY is not detected, the block 296 is executed to detect the occurrence of a RUN THROUGH condition. The term RUN THROUGH refers to an accumulator upshift condition in which the stroking of the accumulator is completed prior to completion of the inertia phase of the shift. This condition is detected by identifying a sharp increase in the rate of change of ratio during the shift.

In either of the above-described low pressure conditions—that is, LONG DELAY or RUN THROUGH—the shift time as measured by blocks 282-290 does not reliably reflect the appropriateness of the shift pressure. In fact, these conditions result in the measurement of a very short shift time, which would normally mean that the pressure should be decreased further. To counter this condition in future like shifting, the relatively high gear-dependent pressure term Kad is applied to the stored adaptive correction array at block 300, described below.

Once the shift time has been measured by blocks 282-290, the block 302 is executed to determine if the entry conditions for adaptive updating are satisfied. Such conditions may include: normal pattern shift, transmission oil temperature TEMP and throttle %T within limits, no large throttle changes in the shift, not a jump-shift, and not a step-out shift. If the entry conditions are not met, no updating of the adaptive pressure correction memory array is carried out.

If the entry conditions defined by block 302 are met, the blocks 304 and 306 are executed to look-up the desired shift time IPdes and the adaptive pressure correction amount LPmod. As noted at block 304, the desired shift time IPdes is determined as a function of gear and the throttle position %Tinit at the initiation of the shift. The adaptive modifier LPmod, in turn, is determined as a function of gear and the error or difference between the measured shift time IP TIMER and the desired shift time IPdes.

Finally, the block 300 updates the stored cumulative pressure correction table in accordance with the adaptive modifier LPmod. The term LPad(n) refers to the correction amount stored in the primary memory cell—that is, the cell associated with the range of throttle positions which includes the throttle position %Tinit. The pressure modifier LPmod is fully applied to this cell, as indicated. The terms LPad(n−1) and LPad(n+1) refer to the memory cells associated with throttle ranges adjacent the primary cell throttle range. As indicated at block 300, one-half of the pressure modifier LPmod is applied to these cells. The terms LPad(n−2) and LPad(n+2) refer to the memory cells associated with throttle ranges adjacent to the adjacent cells (n−1) and (n+1). As indicated, one-fourth of the pressure modifier LPmod is applied to these cells. Of course, the various percentages and constants may vary depending on the application.

While this invention has been described in reference to the illustrated embodiment, it is expected that various modifications will occur to those skilled in the art. In this regard, it should be realized that controls incorporating such modifications may fall within the scope of this invention, which is defined by the appended claims.

The embodiments of the invention in which an exclusive property or privilege is claimed are defined as follows:

1. In a motor vehicle multiple speed ratio transmission including an electro-hydraulic element which regulates a pressure of fluid supplied to fluid pressure operated control elements to effect speed ratio shifting, look-up means for storing predefined pressure commands for said electro-hydraulic element as a function of a measured value of a vehicle operating parameter, and adaptive means for developing an adaptive pressure correction amount for said predefined pressure commands based on a detected deviation in progression of said shifting compared to a desired shift progression, control apparatus comprising:

a multiple cell memory array for storing cumulative pressure correction amounts, respective cells being associated with specified contiguous ranges of said vehicle operating parameter;

means effective in response to development of an adaptive correction amount by said adaptive means following said shifting for selecting a cell associated with a range of said vehicle operating parameter which includes a value of said vehicle operating parameter measured upon initiation of such shifting;

means for updating cumulative pressure correction amounts stored in a range of cells including said selected cell, in accordance with said adaptive correction amount; and means for controlling said electro-hydraulic element as a combined function of a predefined pressure command obtained from said look-up means and a cumulative correction amount obtained from said memory array.

2. The control apparatus set forth in claim 1, wherein said transmission is coupled to an engine having a throttle positionable to control its power output, and said vehicle operating parameter is a position of said throttle.

3. The control apparatus set forth in claim 1, wherein said adaptive correction amount is applied in full to said selected cell, and in part to other cells in said range of cells.

4. The control apparatus set forth in claim 1, wherein said cumulative correction amount obtained from said memory array is obtained by interpolation between a first cumulative correction amount stored in a cell associated with a first range of vehicle operating parameters including a measured value of said vehicle operating parameter and a second cumulative correction amount stored in a cell associated with a second range of vehicle operating parameters contiguous to said first range.

5. In a motor vehicle multiple speed ratio transmission including an electro-hydraulic element which regulates a pressure of fluid supplied to fluid pressure operated control elements to effect speed ratio shifting, look-up means for storing predefined pressure commands for said electro-hydraulic element as a function of a measured value of a vehicle operating parameter, adaptive means for developing an adaptive pressure correction amount for said predefined pressure commands based on a detected deviation in progression of said shifting compared to a desired shift progression, and a multiple cell memory array for storing cumulative pressure correction amounts, respective cells being associated with specified contiguous ranges of said vehicle operating parameter, a method of operation comprising the steps of:

selecting a cell associated with a range of said vehicle operating parameter which includes a value of said vehicle operating parameter measured upon initiation of shifting;

updating said cumulative pressure correction amounts stored in a range of cells including said selected cell, in accordance with said adaptive correction amount developed by said adaptive means; and controlling said electro-hydraulic element as a combined function of a predefined pressure command obtained from said look-up means and a cumulative correction amount obtained from said memory array.

6. The method of operation set forth in claim 5, where said transmission is coupled to an engine having a throttle positionable to control its power output, and said vehicle operating parameter is a position of said throttle.

7. The method of operation set forth in claim 5, wherein said adaptive correction amount is applied in full to said selected cell, and in part to other cells in said range of cells.

8. The method of operation set forth in claim 5, wherein said cumulative correction amount obtained from said memory array is obtained by interpolation between a first cumulative correction amount stored in a cell associated with a first range of vehicle operating parameters including a measured value of said vehicle operating parameter and a second cumulative correction amount stored in a cell associated with a second range of vehicle operating parameters contiguous to said first range.

* * * * *